US012686589B2

(12) United States Patent
Gou

(10) Patent No.: US 12,686,589 B2
(45) Date of Patent: Jul. 21, 2026

(54) METHOD AND APPARATUS FOR PROVIDING ELEVATOR SERVICE TO A TARGET DEVICE WITH SELF-PROPELLED CAPABILITY

(71) Applicant: Otis Elevator Company, Farmington, CT (US)

(72) Inventor: Xingang Gou, Tianjin (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1078 days.

(21) Appl. No.: 17/836,083

(22) Filed: Jun. 9, 2022

(65) Prior Publication Data

US 2023/0161861 A1     May 25, 2023

(30) Foreign Application Priority Data

Nov. 24, 2021   (CN) .......................... 202111406691.1

(51) Int. Cl.
*B66B 1/34* (2006.01)
*B66B 1/26* (2006.01)
*B66B 1/46* (2006.01)
*B66B 3/00* (2006.01)
*H04W 4/33* (2018.01)

(52) U.S. Cl.
CPC ............ B66B 1/3461 (2013.01); B66B 1/468 (2013.01); B66B 3/002 (2013.01); *B66B 2201/4638* (2013.01); *B66B 2201/4653* (2013.01); *B66B 2201/4676* (2013.01); *H04W 4/33* (2018.02)

(58) Field of Classification Search
CPC .................... B66B 1/34; B66B 1/3415; B66B 1/3446–3461; B66B 1/46; B66B 1/468; B66B 3/00–004; B66B 5/00–0012; B66B 2201/10–104; B66B 2201/405; B66B 2201/4615; B66B 2201/4623; B66B 2201/4638; B66B 2201/4653; B66B 2201/4676; B66B 2201/4684
See application file for complete search history.

(56) References Cited

U.S. PATENT DOCUMENTS

| | | | |
|---|---|---|---|
| 11,430,278 B2 * | 8/2022 | Kim ......................... | B66B 1/468 |
| 2017/0270725 A1 * | 9/2017 | Troesch ............. | G07C 9/00174 |
| 2021/0122606 A1 * | 4/2021 | Kim ...................... | B66B 1/3446 |

(Continued)

*Primary Examiner* — Christopher Uhlir
(74) *Attorney, Agent, or Firm* — CANTOR COLBURN LLP

(57) ABSTRACT

A method for providing elevator services includes: generating a dispatch command for stopping an elevator to a departure floor of a target device with self-propelled capability in response to an elevator reservation message from a computer system, wherein the elevator reservation message includes an identification of the target device and an identification of the departure floor; instructing the computer system to send a confirmation message to the target device, the confirmation message includes a password associated with the target device; after the elevator stops at the departure floor of the device and before starting the elevator, determining whether a state of the car satisfies set conditions, wherein the set conditions at least include: an identity authentication of the device in the car based on the password has passed; and if the set conditions are satisfied, the elevator is started; otherwise, the elevator is prohibited from starting.

35 Claims, 8 Drawing Sheets

(56) References Cited

U.S. PATENT DOCUMENTS

| 2021/0387829 | A1 * | 12/2021 | Min | B66B 1/2408 |
| 2022/0017332 | A1 * | 1/2022 | Kim | B66B 13/14 |
| 2023/0110004 | A1 * | 4/2023 | Bloomgren | B66B 1/2408 187/388 |
| 2024/0010461 | A1 * | 1/2024 | Haapaniemi | B66B 1/2408 |

* cited by examiner

510

530

540

520

50

80

METHOD AND APPARATUS FOR PROVIDING ELEVATOR SERVICE TO A TARGET DEVICE WITH SELF-PROPELLED CAPABILITY

FOREIGN PRIORITY

This application claims priority to Chinese Patent Application No. 202111406691.1, filed Nov. 24, 2021, and all the benefits accruing therefrom under 35 U.S.C. § 119, the contents of which in its entirety are herein incorporated by reference.

TECHNICAL FIELD

The present application relates to elevator technology, and in particular, to a method for providing elevator services for a target device with self-propelled capability, and an elevator controller, computer system, and computer-readable storage medium for implementing the method.

BACKGROUND

With the continuous development of industrial control technology, the application scope of devices with self-capacities (such as mobile robots) has been greatly expanded. Within tall buildings, there is a need to provide ride services for these devices. But this may pose a security risk. For example, if people share an elevator with a robot performing epidemic prevention operations, they may be infected by a virus or bacteria. For another example, some devices are equipped with large-capacity batteries, once the devices fire and explode, it will cause great harm to the colleagues. Therefore, corresponding safety measures have been formulated, including prohibiting people from sharing elevators with dangerous devices.

SUMMARY

According to one aspect of the present application, there is provided an elevator controller, comprising: memory; processor; and a computer program stored on the memory and running on the processor, the running of the computer program causes:

A. generating a dispatch command for stopping an elevator to a departure floor of a target device with self-propelled capability in response to an elevator reservation message from a computer system, wherein the elevator reservation message includes an identification of the target device and an identification of the departure floor;

B. instructing the computer system to send a confirmation message to the target device, the confirmation message includes a password associated with the target device;

C. after the elevator stops at the departure floor of the target device and before starting the elevator, determining whether a state of the car satisfies set conditions, wherein the set conditions at least include: an identity authentication of the device in the car based on the password has passed; and D. if the set conditions are satisfied, the elevator is started; otherwise, the elevator is prohibited from starting.

Optionally, the computer system is a cloud platform or a server.

Optionally, the identification of the target device is an international mobile user identification number associated with a user identification module set on the target device.

In addition to the above-mentioned one or more features, in the above-mentioned elevator controller, the elevator reservation message also includes a designation of an elevator operation mode and an identification of an arrival floor, and the running of the computer program causes step A to include:

A1. receiving an elevator reservation message from the computer system;

A2. generating a dispatch command if it is determined that the car has a space for accommodating the target device and it is determined that the device has an authority to use elevator service in a designated elevator operation mode according to the identification of the target device, and the dispatch command includes an identification of the departure floor where the elevator stops and an identification of the arrival floor;

A3. instructing a call unit associated with the departure floor to present a prompt message to passengers not to take the currently stopped elevator.

In addition to the above-mentioned one or more features, in the above-mentioned elevator controller, the running of the computer program causes step B to include:

B1. generating a password associated with the target device, wherein the password is generated based on at least one of the following items: a random number, an identification of the target device and a timing signal;

B2. sending a message indicating that the dispatch command has been generated to the computer system, the message includes the generated password.

Optionally, in the above-mentioned elevator controller, the set conditions further includes that there is no passenger in the car, and the running of the computer program causes step C to include:

C1. performing an identity authentication of the device in the car by comparing the password associated with the target device with a password received from the device in the car;

C2. determining presence of the passenger according to images or videos acquired by an image sensor arranged in the car.

In addition to the above-mentioned one or more features, in the above-mentioned elevator controller, the running of the computer program causes step B to include:

B1'. sending a message indicating that the dispatch command has been generated to the computer system, so that the computer system generates a password associated with the target device and sends a confirmation message containing the password to the target device, the password is generated based on at least one of the following items: an identification of the target device and a timing signal.

Optionally, in the above-mentioned elevator controller, the set conditions further includes that there is no passenger in the car, and the running of the computer program causes step C to include:

C1'. generating a password associated with the target device according to an algorithm corresponding to or identical to the computer system;

C2'. performing an identity authentication of the device in the car by comparing the password generated according to the corresponding or identical algorithm with a password received from the device in the car;

C3'. determining presence of the passenger according to images or videos acquired by an image sensor arranged in the car.

In addition to the above-mentioned one or more features, in the above-mentioned elevator controller, the running of the computer program causes step B to include:

B1". sending a message indicating that the dispatch command has been generated to the computer system, so that the computer system generates a password associated with the target device, sends a confirmation message containing the password to the target device, and sends the password to the elevator controller, the password is generated based on at least one of the following items: a random number, an identification of the target device and a timing signal.

Optionally, in the above-mentioned elevator controller, the set conditions further includes that there is no passenger in the car, and the running of the computer program causes step C to include:

C1". performing an identity authentication of the device in the car by comparing the password from the computer system with a password received from the device in the car;

C2". determining presence of the passenger according to images or videos acquired by an image sensor arranged in the car.

In addition to the above-mentioned one or more features, in the above-mentioned elevator controller, the running of the computer program also causes:

E. if the number of occurrences of events that do not satisfy the set conditions is greater than a predetermined threshold, a warning message is generated;

F. receiving settings of rejecting all elevator reservation messages or rejecting elevator reservation messages with characteristics specified by user input.

According to another aspect of the present application, there is provided a method for providing elevator services for a target device with self-propelled capability, comprising the following steps performed by an elevator controller:

A. generating a dispatch command for stopping an elevator to a departure floor of a target device with self-propelled capability in response to an elevator reservation message from a computer system, wherein the elevator reservation message includes an identification of the target device and an identification of the departure floor;

B. instructing the computer system to send a confirmation message to the target device, the confirmation message includes a password associated with the target device;

C. after the elevator stops at the departure floor of the target device and before starting the elevator, determining whether a state of the car satisfies set conditions, wherein the set conditions at least include: an identity authentication of the device in the car based on the password has passed; and D. if the set conditions are satisfied, the elevator is started; otherwise, the elevator is prohibited from starting.

According to another aspect of the present application, there is provided a computer system, comprising: memory; processor; and a computer program stored on the memory and running on the processor, the running of the computer program causes:

A. generating an elevator reservation message in response to an elevator ride request from a second computer system, wherein the elevator ride request and the elevator reservation message include an identification of a target device with self-propelled capability and an identification of a departure floor;

B. sending the generated elevator reservation message to an elevator controller to instruct the elevator controller to generate a dispatch command for stopping an elevator to the departure floor of the target device;

C. generating a confirmation message in response to a message from the elevator controller indicating that the dispatch command has been generated, the confirmation message includes a password associated with the target device, wherein the password is used for an identity authentication of the target device when taking an elevator; and D. sending the generated confirmation message to the target device.

According to another aspect of the present application, there is provided a method for providing elevator services for a target device with self-propelled capability, comprising the following steps performed by a first computer system:

A. generating an elevator reservation message in response to an elevator ride request from a second computer system, wherein the elevator ride request and the elevator reservation message include an identification of a target device with self-propelled capability and an identification of a departure floor;

B. sending the generated elevator reservation message to an elevator controller to instruct the elevator controller to generate a dispatch command for stopping an elevator to the departure floor of the target device;

C. generating a confirmation message in response to a message from the elevator controller indicating that the dispatch command has been generated, the confirmation message includes a password associated with the target device, wherein the password is used for an identity authentication of the target device when taking an elevator; and D. sending the generated confirmation message to the target device.

According to another aspect of the present application, there is provided a computer-readable storage medium having instructions stored in the computer-readable storage medium, when the instructions are executed by a processor, the processor is caused to execute the above method.

DESCRIPTION OF THE DRAWINGS

The above and/or other aspects and advantages of the present application will be more clearly and easily understood from the following description of various aspects in conjunction with the accompanying drawings, in which the same or similar elements are designated by the same reference numerals. The accompanying drawings include.

LIST OF REFERENCE NUMBERS

Figure 1:
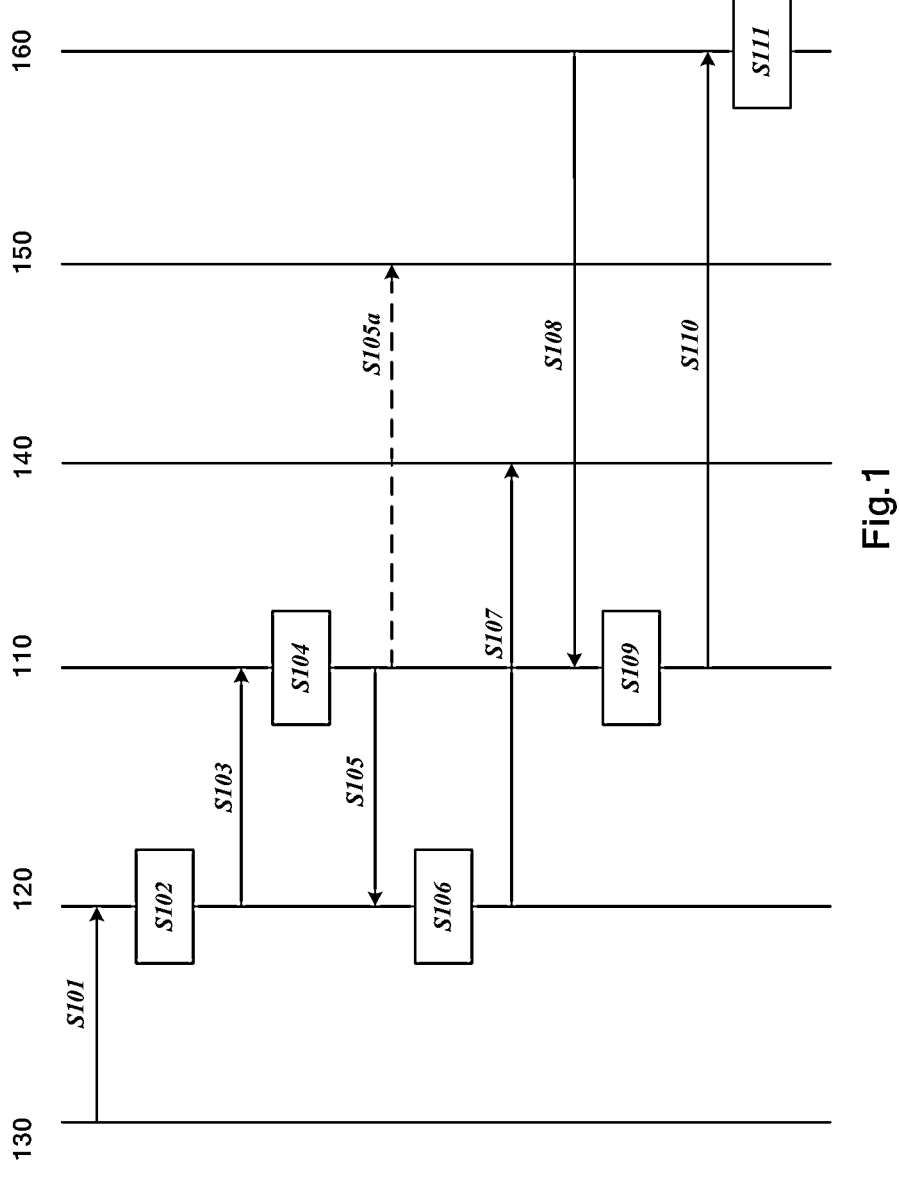
FIG. 1 is a schematic diagram of an elevator service provision process according to some embodiments of the present application.

110 Elevator controller
120 First computer system
130 Second computer system
140 Target device

150 Call unit

160 Car controller

S401 Receive an elevator reservation message

S402 Is elevator service allowed to be provided?

S403 Generate a dispatch command

S404 Generate a feedback message for rejecting the reservation

S405 Send a message that the dispatch command is generated or a message that the reservation is rejected

S406 Receives a password and optional images or videos inside the car

S407 Satisfy the set conditions?

S408 Start the elevator

S409 Prohibit the elevator from starting and count the number of occurrences of events that do not satisfy the set conditions

S410 Send or present a prompt message of leaving the car

510 Communication unit

520 Memory

530 Processor

540 Computer program

S601 Receive an elevator ride request

S602 Generate an elevator reservation message

S603 Send the elevator reservation message

S604 Receive a message indicating that the dispatch command has been generated and including a password

S605 Generate a confirmation message

S606 Send the confirmation message

S701 Receive an elevator ride request

S702 Generate an elevator reservation message

S703 Send the elevator reservation message

S704 Receive a message indicating that the dispatch command has been generated

S705 Generate a password

S706 Generate a confirmation message

S707 Send the confirmation message

810 Communication unit

820 Memory

830 Processor

840 Computer program

DETAILED DESCRIPTION

The present application is described more fully below with reference to the accompanying drawings, in which illustrative embodiments of the application are illustrated. However, the present application may be implemented in different forms and should not be construed as limited to the embodiments presented herein. The presented embodiments are intended to make the disclosure herein comprehensive and complete, so as to more comprehensively convey the protection scope of the application to those skilled in the art.

In this specification, terms such as "comprising" and "including" mean that in addition to units and steps that are directly and clearly stated in the specification and claims, the technical solution of this application does not exclude the presence of other units and steps that are not directly and clearly stated in the specification and claims.

Unless otherwise specified, terms such as "first" and "second" do not indicate the order of the units in terms of time, space, size, etc., but are merely used to distinguish the units.

In some embodiments of the present application, when a computer system coupled to an elevator controller (such as a cloud platform or server maintained and operated by elevator manufacturers and property service providers) receives an elevator ride request associated with a target device with self-propelled capability from other computer systems (such as a cloud platform or server maintained and operated by special operation service providers or logistics service providers), it generates a corresponding elevator reservation message based on the elevator ride request and sends the elevator reservation message to the elevator controller. Then, the elevator controller determines whether the target device specified in the elevator reservation message has the authority to use the requested elevator service, and generates a control command for dispatching the elevator to stop to the departure floor after the device has the corresponding authority. Examples of the target device described here include, but are not limited to, transport robots, disinfection operation robots, dangerous goods monitoring operation robots, dangerous goods transporting operation robots, and device equipped with high-density energy storage units.

In some embodiments of the present application, the elevator ride request and elevator reservation messages may include an identification of the target device and an identification of the departure floor of the target device. In addition, the elevator reservation message may also include a designation of an elevator operation mode.

In some embodiments of the present application, after the elevator stops at the departure floor of the device and before starting the elevator, it will be determined whether a state of the car satisfies set conditions. The above set conditions at least include: i) the device indicated by the elevator reservation message is located in the car or the device in the car has passed identity authentication. Optionally, the set conditions may further include: ii) there is no passenger in the car. When the set conditions are satisfied, the elevator controller will start the elevator. Optionally, when the elevator reservation message contains the designation of the elevator operation mode, after satisfying the set conditions, the elevator controller will start the elevator to enter the designated mode. Optionally, presence of the passenger may be determined using images or videos of the interior of the car captured by an image sensor, and the images or videos may be acquired using an image sensor arranged in the car.

On the other hand, if the set conditions are not satisfied, the elevator controller will prohibit the starting of the elevator. Optionally, the elevator controller can also instruct the car controller to display prompt message through a display device (eg, an LED display device) in the car or play a prompt voice through a sound output device (eg, a speaker) to prompt passengers to leave the car. In another optional manner, the elevator controller instructs the car controller to send a message that the identity authentication fails to the device in the car. Optionally, when the set conditions are not satisfied, the elevator controller will generate a dispatch command for the elevator reservation message again.

Optionally, the elevator controller is configured to generate a warning message to prompt a user, such as a building administrator, when the number of occurrences of events that do not satisfy the set conditions is greater than a predetermined threshold.

In some embodiments of the present application, after the dispatch command is generated, a confirmation message may be sent to the target device specified in the elevator reservation message, where the confirmation message includes a password for identity authentication of the target device. For example, identity authentication is performed by comparing the password in the confirmation message with the password received from the device in the car. if the two match, it is determined that the target device indicated by the elevator reservation message is located in the car; otherwise, it is determined that the identity authentication has not been passed. The identity authentication mechanism can prevent unauthorized devices from taking the elevator, which is particularly advantageous in some application scenarios. For example, for safety reasons, it is necessary to carry out stricter management on dangerous goods transporting operation robots, so it is particularly necessary to prevent such device from using the identity of other device to take the elevator.

In some embodiments of the present application, the confirmation message is sent by a computer system coupled to the elevator controller (such as a cloud platform or remote server maintained and operated by elevator manufacturers). Typically, the computer system described above is capable of communicating with multiple elevator controllers and target devices within a larger geographic area (eg, an entire city or multiple neighborhoods, or even multiple cities), so sending a confirmation message via the computer system is conducive to improving the efficiency of communication and operation management.

When the communication between the computer system and the target device is via a 4G or 5G mobile communication network, it is usually necessary to set a user identification module (such as a SIM card and a USIM card) on the target device. Optionally, in this case, an international mobile user identification number associated with the user identification module can be used as the identification of the target device. Because of the uniqueness of the international mobile user identification number, it is advantageous to use it as device identification. In addition, the user identification module provides a safe and reliable user identity authentication mechanism to prevent the identity of the device from being falsely used and the user data transmitted on the wireless channel from being stolen (that is, to prevent the phenomenon of "number theft and machine merging"), which helps to realize the aforementioned need to prevent unauthorized devices from taking the elevator through the identity authentication mechanism.

Optionally, the password may be generated by the elevator controller and included in the confirmation message sent to the target device. Optionally, the password may be generated by the computer system described above and included in the confirmation message sent to the target device. In order to realize the identity authentication based on the password at the elevator controller, optionally, the computer system can send the generated password to the elevator controller; or alternatively, the generation algorithm of the password is shared between the computer system and the elevator controller, that is, the computer system and the elevator controller use the corresponding or the same algorithm to generate the password, so the elevator controller can perform identity authentication using the password generated locally.

Optionally, the password can be generated based on at least one of the following items: a random number, the identification of the target device (such as an international mobile user identification number) and a timing signal (such as time service information sent by mobile communication network or synchronization signal between the computer system and elevator controller, etc.).

In some embodiments of the present application, while generating the dispatch command, the elevator controller may also instruct a call unit or an outbound call control unit associated with the departure floor (for example, the call unit or the outbound call control unit located on the departure floor) to display prompt message on its display module (such as LED display device) or play prompt voice through sound output device (such as speaker) to remind passengers not to take the currently stopped elevator.

In some embodiments of the present application, the elevator controller is configured to provide a high level of administrative rights, enabling a user, such as a building administrator, to decide whether to reject all elevator reservation messages or specific elevator reservation messages (for example, under the designated elevator operation mode, device with specific identification, etc.). Illustratively, the above configuration enables a building administrator to stop providing elevator service to device during an emergency or high traffic flow.

FIG. 1 is a schematic diagram of an elevator service provision process according to some embodiments of the present application.

In FIG. 1, the elevator service provision process is illustrated from the perspective of multiple participants. The participants involved in this process include an elevator controller or elevator control cabinet 110 (e.g., a general-purpose microprocessor-based device executing a computer program stored on a storage medium to perform the operations described herein), a first computer system 120 (e.g., a cloud platform of elevator manufacturers or property service providers), a second computer system 130 (e.g., a cloud platform of logistics service providers), a target device 140 with self-propelled capability (e.g., a mobile robot that completes various operations described herein), a call unit or an outbound call control unit 150 (e.g., a general-purpose microprocessor-based device executing a computer program stored on a storage medium to perform the operations described herein), a car controller 160 (e.g., a general-purpose microprocessor-based device executing a computer program stored on a storage medium to perform the operations described herein), etc.

The elevator service provision process shown in FIG. 1 includes the following steps:

S101: The second computer system 130 sends an elevator ride request to the first computer system 120. Optionally, the elevator ride request includes an identification of the target device 140 (eg, an international mobile user identification number) and a departure floor of the device. In addition, the elevator ride request may also include a designation of an elevator operation mode and an arrival floor of the target device.

S102: The first computer system 120 generates an elevator reservation message according to the elevator ride request. In addition to the identification of the target device 140 and the departure floor of the device, the elevator reservation message may optionally include a designation of an elevator operation mode and an arrival floor of the target device.

S103: The first computer system 120 sends the elevator reservation message to the elevator controller 110.

S104: The elevator controller 110 generates a dispatch command for stopping the elevator to the departure floor according to the received elevator reservation message.

In step S104, the elevator controller 110 also generates a password associated with the target device 140. As described above, the password may be generated based on at least one of the following items: a random number, an identification of the target device and a timing signal.

Illustratively, a list of devices permitted to use elevator services may be stored in elevator controller 110 locally or external storage device independent of elevator controller 110, the list includes the identification of the permitted device and the category of permitted elevator operation modes (when there are multiple elevator operation modes).

Therefore, the elevator controller 110 can determine whether the device indicated by the elevator reservation message has the authority to use the elevator service by looking up the table according to the device identification in the elevator reservation message, or when the elevator reservation message contains the designation of the elevator operation mode, determine whether the device indicated by the elevator reservation message has the authority to use the elevator service in the designated elevator operation mode by looking up the table. If it is determined to have the corresponding authority, a dispatch command including the departure floor where the elevator stops can be generated, so that under the control of the elevator controller 110, the elevator is directed to the departure floor where the device is located; otherwise, a feedback message for rejecting the elevator reservation message is generated.

Optionally, when the designated elevator operation mode allows multiple devices to be carried at the same time, in addition to determining the use authority, the elevator controller 110 also determines whether the elevator car can accommodate the device indicated by the elevator reservation message. When it is determined that there are corresponding authority and accommodation space, the dispatch command is generated; otherwise, a feedback message is generated that rejects the elevator reservation message. Exemplarily, if the indicated device is a dangerous goods transporting operation robot and the carrying capacity of the car is 3 such devices, it will be determined that the car meets the requirements of accommodation space when the car has carried 2 devices, and it will be determined that the car does not meet the requirements of accommodation space when the car has carried 3 devices; for another example, although the number of devices currently carried by the car is 2, if the dispatch command to call the current elevator has been generated for the previous elevator reservation message (assuming that the indicated device is also a dangerous goods transporting operation robot), it will still be determined that the car does not meet the requirements of accommodation space.

In step S104, optionally, the elevator controller 110 may also generate a command instructing the call unit 150 of the departure floor to present a prompt message not to take the currently stopped elevator.

S105: The elevator controller 110 sends to the first computer system 120 a message that a dispatch command has been generated or a message that the elevator reservation message has been rejected. Optionally, the password generated in step S104 may be included in the message that the dispatch command has been generated.

S105*a*: The elevator controller 110 may also send a command to present prompt message to the call unit 150 of the departure floor.

S106: The first computer system 120 generates a confirmation message including the password associated with the target device 140 sent by the elevator controller 110 in step S105.

S107: The first computer system 120 sends the generated confirmation message to the target device 140.

S108: After the elevator stops at the departure floor, the car controller 160 transmits the password received from the device located in the car to the elevator controller 110, which can be received by the wireless signal transceiver device (such as Bluetooth module, WiFi module, etc.) inside the car. Optionally, the car controller 160 may also transmit images or videos inside the car to the elevator controller 110, which may be acquired by an image sensor arranged in the car.

S109: The elevator controller 110 determines whether set conditions are satisfied according to the data (eg, a password, images or videos) received from the car controller 160. The above set conditions at least include: i) the identity authentication of the device in the car based on the password has passed. Optionally, the set conditions may further include: ii) there is no passenger in the car. When the set conditions are satisfied, the elevator controller 110 starts the elevator (eg, enters the operation mode specified by the elevator reservation message). On the other hand, if the set conditions are not satisfied, the elevator controller 110 prohibits the starting of the elevator.

In this step, optionally, the elevator controller 110 will generate a dispatch command again for the target device indicated by the elevator reservation message. In addition, optionally, the elevator controller 110 may also generate a control command about the car controller, instructing the car controller 160 to present the prompt message of leaving the car to passengers in the car or send the prompt message of leaving the car to the device in the car.

S110: The elevator controller 110 sends the generated control command to the car controller 160.

S111: The car controller 160 presents the prompt message of leaving the car to the passengers in the car or sends the prompt message of leaving the car to the device in the car.

Figure 2:
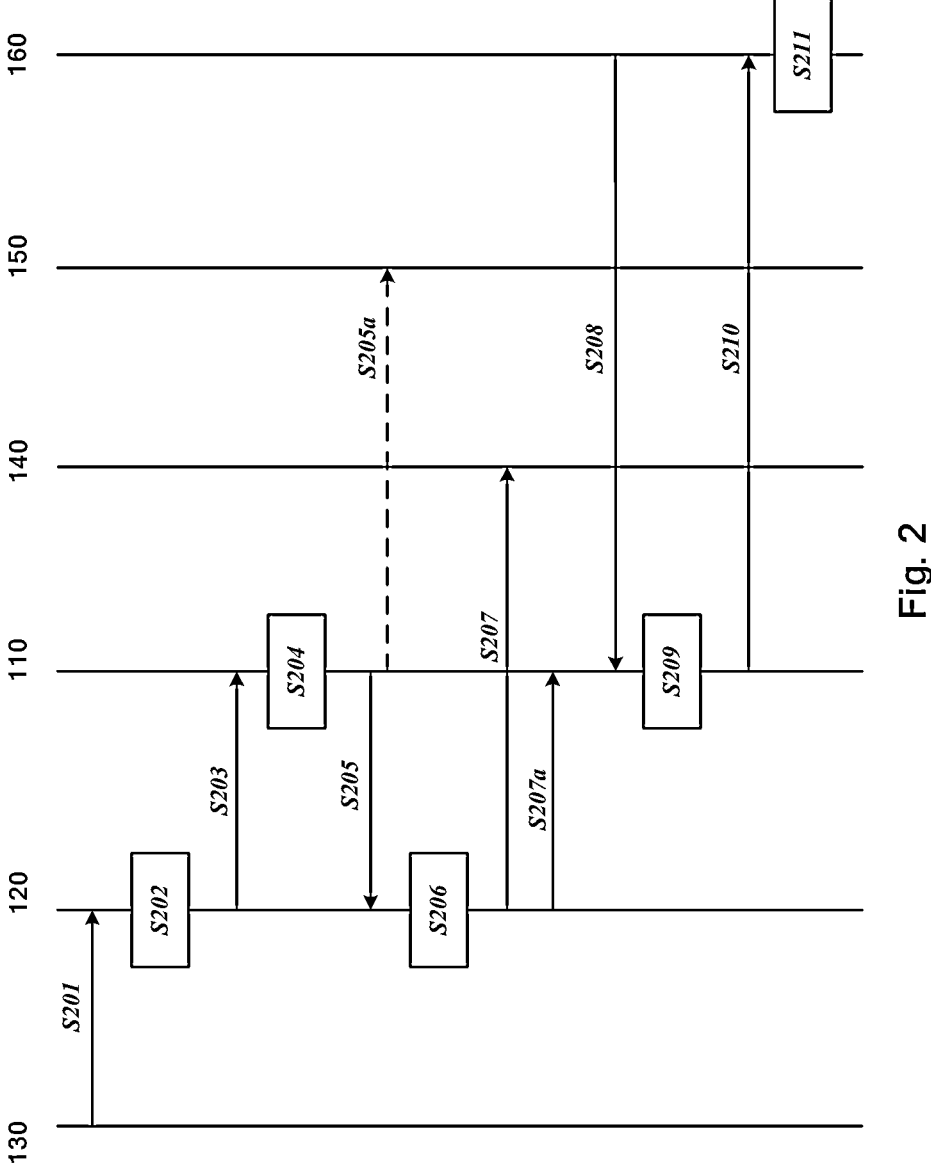
FIG. 2 is a schematic diagram of an elevator service provision process according to other embodiments of the present application.

FIG. 2 is a schematic diagram of an elevator service provision process according to other embodiments of the present application.

In FIG. 2, the elevator service provision process is also illustrated from the perspective of multiple participants. The participants involved in this process include an elevator controller or elevator control cabinet 110, a first computer system 120 (eg, a cloud platform of elevator manufacturers or property service providers), a second computer system 130 (eg, a cloud platform of logistics service providers), a target device 140 with self-propelled capability (eg, a mobile robot that completes various operations), a call unit or an outbound call control unit 150, a car controller 160, etc.

In the elevator service provision process shown in FIG. 2, steps S201-203 are respectively similar to steps S101-S103 in FIG. 1, and steps S205, S207, S208-S211 are respectively similar to steps S105, S107, S108-S111 in FIG. 1, but steps S204 and S206 are different from steps S104 and S106, and step S207*a* is added between steps S207 and S208. To avoid repetition, only the differences are described below.

S204: Compared with step S104, in this step, the elevator controller 110 generates a dispatch command for stopping the elevator to the departure floor according to the received elevator reservation message, but does not generate a password associated with the target device 140. Besides, this step may have various features of step S104.

S206: Compared with step S106, in this step, the first computer system 120 generates a password associated with the target device 140 and sends the target device 140 a confirmation message containing the generated password.

S207*a*: The first computer system 120 sends the password generated in step S206 to the elevator controller 110.

Figure 3:
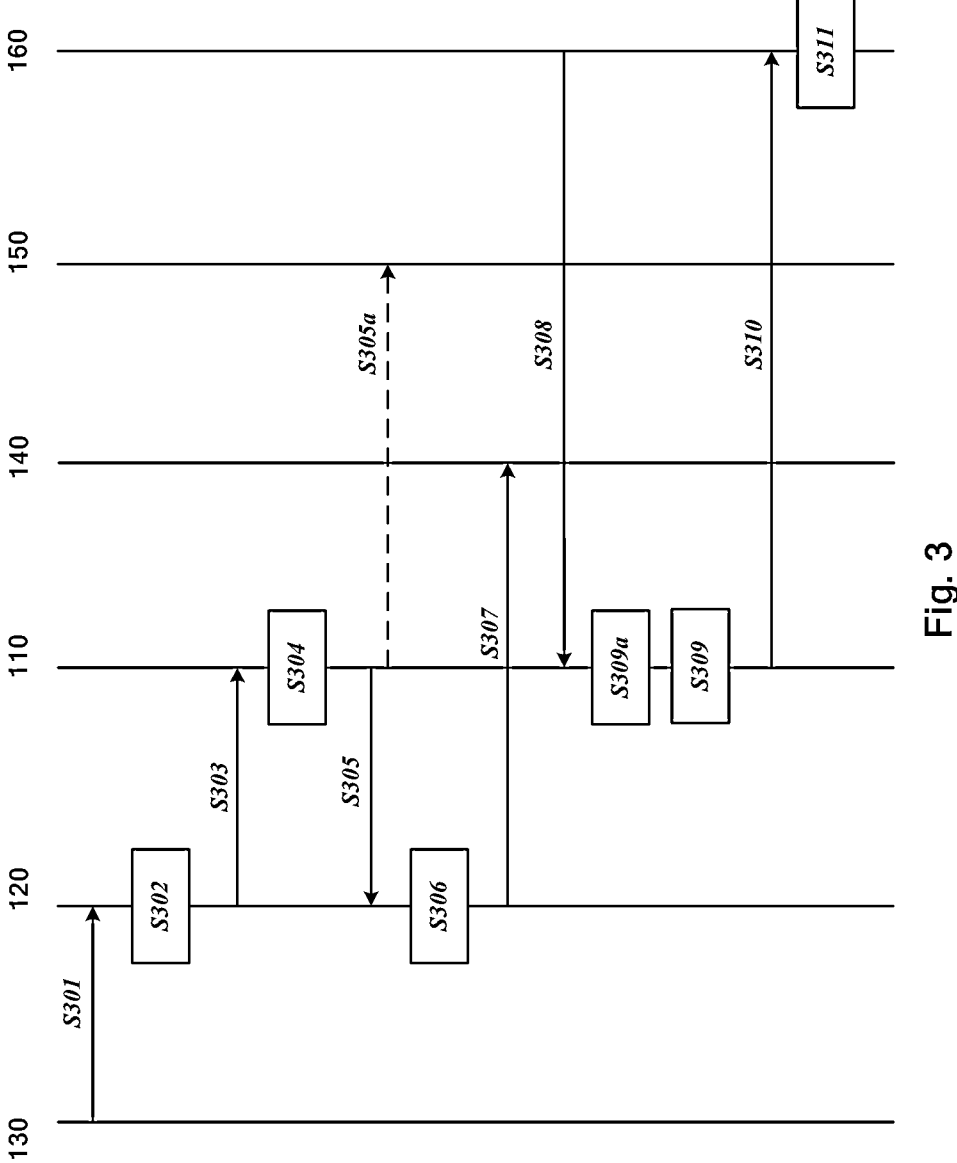
FIG. 3 is a schematic diagram of an elevator service provision process according to other embodiments of the present application.

FIG. 3 is a schematic diagram of an elevator service provision process according to other embodiments of the present application.

In FIG. 3, the elevator service provision process is also illustrated from the perspective of multiple participants. The participants involved in this process include an elevator controller or elevator control cabinet 110, a first computer system 120 (eg, a cloud platform of elevator manufacturers or property service providers), a second computer system 130 (eg, a cloud platform of logistics service providers), a target device 140 with self-propelled capability (eg, a mobile robot that completes various operations), a call unit or an outbound call control unit 150, a car controller 160, etc.

In the elevator service provision process shown in FIG. 3, steps S301-311 are similar to steps S201-S211 in FIG. 2, respectively, and the main difference from the process shown in FIG. 2 is that in the process shown in FIG. 3, step S207*a* is omitted, but step S309*a* is added between steps S308 and S309. To avoid repetition, only the differences are described below.

S309*a*: The elevator controller 110 uses the corresponding algorithm or the same algorithm used in step 306 to generate a password associated with the target device 140.

Figure 4:
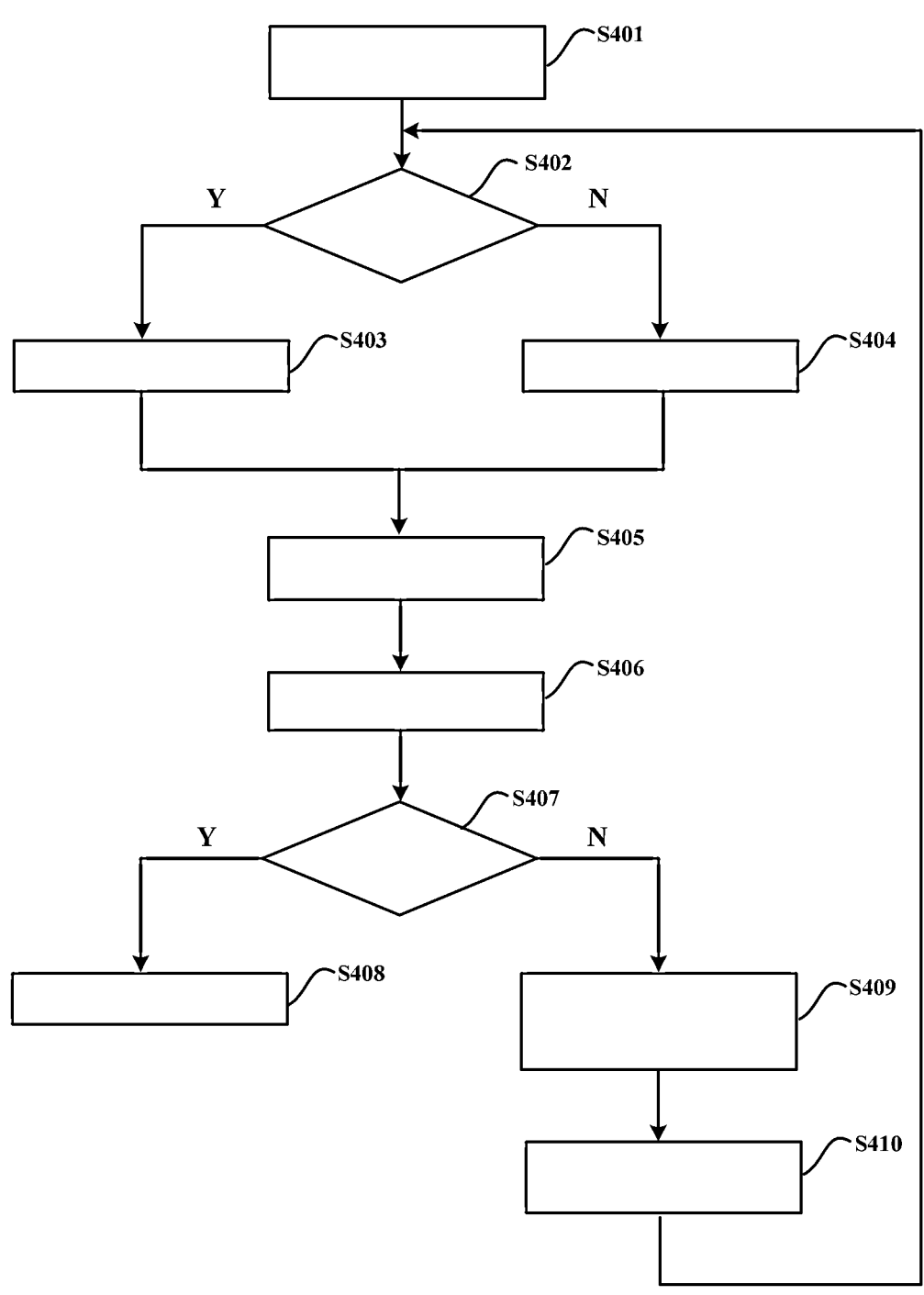
FIG. 4 is a schematic diagram of an elevator service provision process according to other embodiments of the present application.

FIG. 4 is a schematic diagram of an elevator service provision process according to other embodiments of the present application. The process shown in FIG. 4 is executed at an elevator controller (e.g., elevator controller 110 in FIGS. 1-3) and includes the following steps:

S401: Receive an elevator reservation message from a computer processing system (e.g., the first computer system in FIGS. 1-3). As mentioned above, the elevator reservation message includes at least the identification of the target device and the identification of the departure floor. Further, the elevator reservation message may also contain a designation of an elevator operation mode or an identification of an arrival floor.

S402: The elevator controller determines whether to allow elevator service to be provided to the device specified by the elevator reservation message. If it is determined to allow, go to step S403, otherwise go to step S404.

In step S402, the conditions for determining whether to allow include but are not limited to one or more of the following:

Whether the device specified by the elevator reservation message has the authority to use the elevator service.

Whether the device specified by the elevator reservation message has the authorized to use the elevator service in the designated elevator operation mode.

Whether there is an elevator car that can satisfy the received elevator reservation message. For example, whether there is still accommodation space for an elevator car that runs in the same direction as the elevator reservation message and has carried other devices still has accommodation space.

S403: The elevator controller generates a corresponding dispatch command, and the command includes the identification of the departure floor of the device. Optionally, the command may also include the identification of an arrival floor.

In step S403, optionally, the elevator controller also generates a password associated with the target device or a command instructing the call unit of the departure floor to present a prompt message to passengers not to take the currently stopped elevator.

S404: The elevator controller generates a feedback message for rejecting the elevator reservation message.

The flow shown in FIG. 4 proceeds to step S405 after steps S403 and S404.

S405: The elevator controller sends a message that the dispatch command has been generated or a message that the elevator reservation message has been rejected to the computer processing system as the sender of the elevator reservation message. Optionally, the message that the dispatch command has been generated may include a password associated with the target device. Optionally, the elevator controller may also send a command to present prompt message to the call unit of the departure floor.

S406: The elevator controller receives the password of the device located in the car from the car controller, the password is sent by the target device and received by the wireless signal transceiver device (such as a Bluetooth module, a WiFi module, etc.) inside the car. Optionally, the elevator controller also receives images or videos inside the car from the car controller, and these images and videos can be acquired by image sensors arranged in the car.

S407: The elevator controller determines whether the set conditions are satisfied according to the data (e.g., images or videos and password, etc.) received from the car controller. The set conditions and determination methods have been described in detail above, and will not be repeated here. In step S407, if it is determined that the set conditions are satisfied, go to step S408, otherwise go to step S409.

S408: The elevator controller starts the elevator (e.g., enters the operation mode specified by the elevator reservation message).

S409: The elevator controller prohibits the elevator from starting. Optionally, the elevator controller counts the number of occurrences of events that do not satisfy the set conditions, and generates a warning message when the count value is greater than a predetermined threshold.

S410: The elevator controller sends a command to the car controller to instruct the car controller to present the prompt message of leaving the car to passengers in the car, or instruct the car controller to send the prompt message of leaving the car to the device in the car.

Optionally, the flow shown in FIG. 4 returns to step S402 after step S410, generating a dispatch command again for the device indicated by the elevator reservation message.

It should be pointed out that, the execution sequence of the operations of counting the number of events occurring and generating the warning message in step S409 in FIG. 4 is merely an example and not a limitation. These operations may be performed during, before or after any of steps S401-S410.

In addition, the flow shown in FIG. 4 may also include the step of receiving a setting from a user such as a building administrator to reject all elevator reservation messages or elevator reservation messages with characteristics specified by the user input. This step may be performed before or after steps S401-S410.

In step S403, an operation of generating a password associated with the target device by the elevator controller is not necessary. In some variant embodiments, in step S403, the elevator controller generates a corresponding dispatch command but does not generate a password. Correspondingly, in step S407, the password for performing identity authentication may be a password received from the computer system, or may also be a password generated using an algorithm corresponding to or identical to the computer system.

Figure 5:
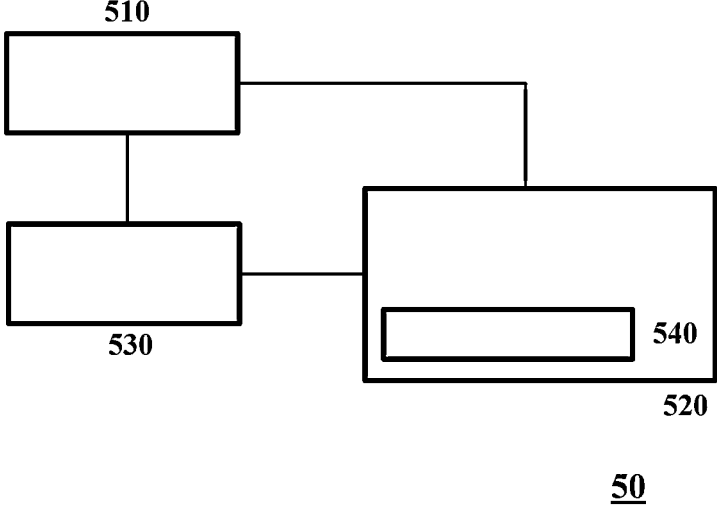
FIG. 5 is a schematic block diagram of a typical elevator controller.

FIG. 5 is a schematic block diagram of a typical elevator controller.

As shown in FIG. 5, elevator controller 50 includes communication unit 510, memory 520 (e.g., non-volatile memory such as flash memory, ROM, hard drive, magnetic disk, optical disk, etc.), processor 530 and a computer program 540 stored on the memory 520 and operable on the processor 530.

The communication unit 510 serves as a communication interface and is configured to establish a communication connection between the elevator controller and an external device or network (e.g., computer system, call unit, and car controller, etc.).

The memory 520 stores a computer program 540 executable by the processor 530. The processor 530 is configured to execute the computer program 540 to implement the elevator service provision process shown in FIG. 4.

Figure 6:
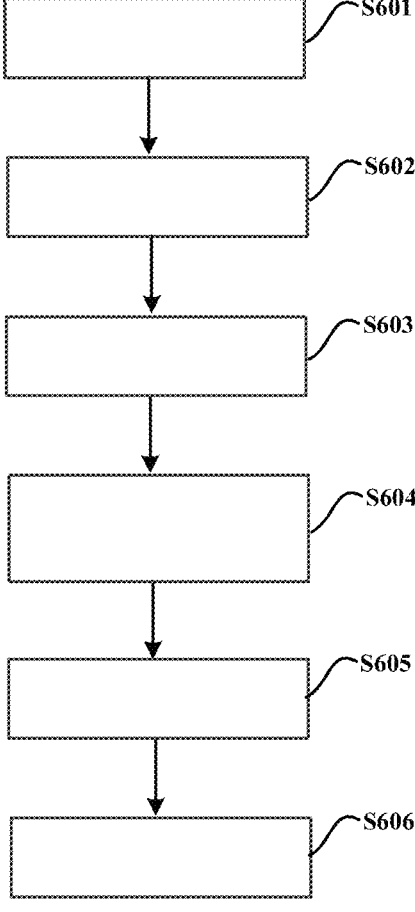
FIG. 6 is a schematic diagram of an elevator service provision process according to other embodiments of the present application.

FIG. 6 is a schematic diagram of an elevator service provision process according to other embodiments of the present application. The process shown in FIG. 6 is performed at a computer system (e.g., the first computer system 120 in FIGS. 1-3) and includes the following steps:

S601: Receive an elevator ride request from other computer processing systems (eg, the second computer system 130 in FIGS. 1-3). As mentioned above, the elevator ride request includes at least an identification of the target device with self-propelled capability and an identification of the departure floor. Further, the elevator ride request may also include a designation of an elevator operation mode or an identification of the arrival floor.

S602: Generate an elevator reservation message, wherein the elevator ride request and the elevator reservation message include an identification of the target device and an identification of the departure floor. Further, the elevator reservation message may also include a designation of an elevator operation mode or an identification of the arrival floor.

S603: Send the generated elevator reservation message to the elevator controller to instruct the elevator controller to generate a dispatch command for stopping the elevator to the departure floor of the target device.

S604: Receive a message from the elevator controller indicating that the dispatch command has been generated. The received message includes the password associated with the target device. The password is used for an identity authentication of the target device when taking an elevator car.

S605: Generate a confirmation message based on the message received from the elevator controller, wherein the confirmation message includes a password associated with the target device.

S606: Send the generated confirmation message to the target device.

Figure 7:
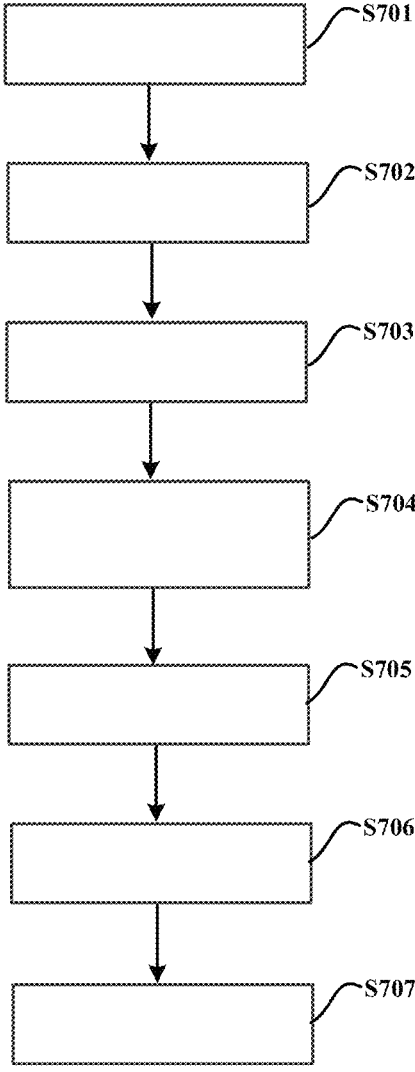
FIG. 7 is a schematic diagram of an elevator service provision process according to other embodiments of the present application.

FIG. 7 is a schematic diagram of an elevator service provision process according to other embodiments of the present application. The process shown in FIG. 7 is performed at a computer system (e.g., the first computer system 120 in FIGS. 1-3). Steps S701-S703 and S707 in FIG. 7 correspond to steps S601-S603 and S606 in FIG. 6 respectively. To avoid repetition, only the differences between the embodiment shown in FIG. 7 and the embodiment shown in FIG. 6 are described below:

S704: Receive a message from the elevator controller indicating that the dispatch command has been generated. Unlike the embodiment shown in FIG. 6, the received message does not contain a password associated with the target device.

S705: In response to the message received from the elevator controller, generate a corresponding password for the target device. Optionally but not necessarily, in step S705, the computer system may also send the generated password to the elevator controller.

S706: Generate a confirmation message, wherein the confirmation message includes a password associated with the target device that is locally generated in the computer system.

Figure 8:
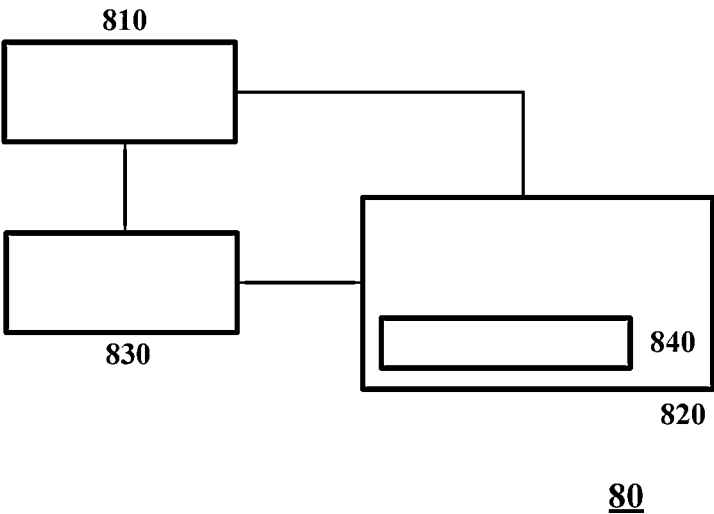
FIG. 8 is a schematic block diagram of a typical computer system.

FIG. 8 is a schematic block diagram of a typical computer system.

As shown in FIG. 8, computer system 80 includes communication unit 810, memory 820 (e.g., non-volatile memory such as flash memory, ROM, hard drive, magnetic disk, optical disk, etc.), processor 830 and a computer program 840 stored on the memory 820 and operable on the processor 830.

The communication unit 810 serves as a communication interface and is configured to establish a communication connection between the computer system and an external device or network (e.g., elevator control and other computer systems, etc.).

The memory 820 stores a computer program 840 executable by the processor 830. The processor 830 is configured to execute the computer program 840 to implement the elevator service provision process shown in FIGS. 6 and 7.

According to another aspect of the present application, there is also provided a computer-readable storage medium on which a computer program is stored, when the program is executed by the processor, one or more steps contained in the flow described above with the help of FIGS. 4, 6 and 7 can be realized.

The computer-readable storage medium referred to in the application includes various types of computer storage media, and may be any available medium that can be accessed by a general-purpose or special-purpose computer. For example, the computer-readable storage medium may include RAM, ROM, EPROM, E2PROM, registers, hard disks, removable disks, CD-ROM or other optical disk storage, magnetic disk storage or other magnetic storage devices, or any other transitory or non-transitory medium that can be used to carry or store a desired program code unit in the form of instructions or data structures and that can be accessed by a general-purpose or special-purpose computer or a general-purpose or special-purpose processor. Disks as used herein usually copy data magnetically, while discs use lasers to optically copy data. The above combination should also be included in the protection scope of the computer-readable storage medium. An exemplary storage medium is coupled to the processor such that the processor can read and write information from and to the storage medium. In the alternative, the storage medium may be integrated into the processor. The processor and the storage medium may reside in the ASIC. The ASIC may reside in the user terminal. In the alternative, the processor and the storage medium may reside as discrete components in the user terminal.

Those skilled in the art will appreciate that the various illustrative logical blocks, modules, circuits, and algorithm steps described herein can be implemented as electronic hardware, computer software, or combinations of both.

To demonstrate this interchangeability of hardware and software, various illustrative components, blocks, modules, circuits, and steps have been described above generally in terms of their functionality. Whether such functionality is implemented in hardware or software depends on the particular application and design constraints imposed on the overall system. Those skilled in the art may implement the described functionality in varying ways for the particular application. However, such implementation decisions should not be interpreted as causing a departure from the scope of the present application.

Although only a few of the specific embodiments of the present application have been described, those skilled in the art will recognize that the present application may be embodied in many other forms without departing from the spirit and scope thereof. Accordingly, the examples and embodiments shown are to be regarded as illustrative and not restrictive, and various modifications may be covered by the application without departing from the spirit and scope of the application as defined by the appended claims.

The embodiments and examples presented herein are provided to best illustrate embodiments in accordance with the present technology and its particular application, and to thereby enable those skilled in the art to make and use the present application. However, those skilled in the art will appreciate that the above description and examples are provided for convenience of illustration and example only. The presented description is not intended to cover every aspect of the application or to limit the application to the precise form disclosed.

What is claimed is:

1. An elevator controller, comprising:
memory;
processor; and
a computer program stored on the memory and running on the processor, the running of the computer program causes:
A. generating a dispatch command for stopping an elevator car to a departure floor of a target device with self-propelled capability in response to an elevator reservation message from a computer system, wherein the elevator reservation message includes an identification of the target device and an identification of the departure floor;
B. instructing the computer system to send a confirmation message to the target device, the confirmation message includes a password associated with the target device;
C. after the elevator stops at the departure floor of the target device and before starting the elevator, determining whether a state of the car satisfies one or more set conditions, wherein the one or more set conditions at least include: an identity authentication of the device in the car based on the password has passed; and
D. if the one or more set conditions are satisfied, the elevator is started; otherwise, the elevator is prohibited from starting;
wherein the identification of the target device is an international mobile user identification number associated with a user identification module set on the target device.

2. The elevator controller of claim 1, wherein the computer system is a cloud platform or a server.

3. The elevator controller of claim 1, wherein the elevator reservation message also includes a designation of an elevator operation mode and an identification of an arrival floor, and the running of the computer program causes step A to include:
A1. receiving an elevator reservation message from the computer system;
A2. generating the dispatch command if it is determined that the car has a space for accommodating the target device and it is determined that the device has an authority to use elevator service in a designated elevator operation mode according to the identification of the target device, and the dispatch command includes an identification of the departure floor where the elevator car stops and an identification of the arrival floor;
A3. instructing a call unit associated with the departure floor to present a prompt message to passengers not to take the stopped elevator car.

4. The elevator controller of claim 1, wherein the running of the computer program causes step B to include:
B1. generating the password associated with the target device, wherein the password is generated based on at least one of the following items: a random number, the identification of the target device and a timing signal;

B2. sending a message indicating that the dispatch command has been generated to the computer system, the message includes the generated password.

5. The elevator controller of claim 4, wherein the one or more set conditions further includes that there is no passenger in the car, and the running of the computer program causes step C to include:
C1. performing an identity authentication of the device in the car by comparing the password associated with the target device with a password received from the device in the car;
C2. determining presence of the passenger according to images or videos acquired by an image sensor arranged in the car.

6. The elevator controller of claim 1, wherein the running of the computer program causes step B to include:
B1'. sending a message indicating that the dispatch command has been generated to the computer system, so that the computer system generates the password associated with the target device and sends the confirmation message containing the password to the target device, the password is generated based on at least one of the following items: the identification of the target device and a timing signal.

7. The elevator controller of claim 6, wherein the one or more set conditions further includes that there is no passenger in the car, and the running of the computer program causes step C to include:
C1'. generating the password associated with the target device according to an algorithm;
C2'. performing an identity authentication of the device in the car by comparing the password generated according to the algorithm with the password received from the target device in the car;
C3'. determining presence of the passenger according to images or videos acquired by an image sensor arranged in the car.

8. The elevator controller of claim 1, wherein the running of the computer program causes step B to include:
B1' sending a message indicating that the dispatch command has been generated to the computer system, so that the computer system generates the password associated with the target device, sends the confirmation message containing the password to the target device, and sends the password to the elevator controller, the password is generated based on at least one of the following items: a random number, the identification of the target device and a timing signal.

9. The elevator controller of claim 8, wherein the one or more set conditions further includes that there is no passenger in the car, and the running of the computer program causes step C to include:
C1' performing an identity authentication of the device in the car by comparing the password from the computer system with the password received from the device in the car;
C2' determining presence of the passenger according to images or videos acquired by an image sensor arranged in the car.

10. The elevator controller of claim 1, wherein the running of the computer program also causes:
E. if a number of occurrences of events that do not satisfy the one or more set conditions is greater than a predetermined threshold, a warning message is generated;
F. receiving settings of rejecting all elevator reservation messages or rejecting elevator reservation messages with characteristics specified by user input.

11. A method for providing elevator services for a target device with self-propelled capability, comprising the following steps performed by an elevator controller:

A. generating a dispatch command for stopping an elevator car to a departure floor of the target device with self-propelled capability in response to an elevator reservation message from a computer system, wherein the elevator reservation message includes an identification of the target device and an identification of the departure floor;

B. instructing the computer system to send a confirmation message to the target device, the confirmation message includes a password associated with the target device;

C. after the elevator stops at the departure floor of the target device and before starting the elevator, determining whether a state of the car satisfies one or more set conditions, wherein the one or more set conditions at least include: an identity authentication of the device in the car based on the password has passed; and D. if the one or more set conditions are satisfied, the elevator is started; otherwise, the elevator is prohibited from starting;

wherein the identification of the target device is an international mobile user identification number associated with a user identification module set on the target device.

12. The method of claim 11, wherein the computer system is a cloud platform or a server.

13. The method of claim 11, wherein the elevator reservation message also includes a designation of an elevator operation mode and an identification of an arrival floor, and step A includes:

A1. receiving the elevator reservation message from the computer system;

A2. generating the dispatch command if it is determined that the car has a space for accommodating the device and it is determined that the device has an authority to use elevator service in a designated elevator operation mode according to the identification of the target device, and the dispatch command includes an identification of the departure floor where the elevator stops and an identification of the arrival floor;

A3. instructing a call unit associated with the departure floor to present a prompt message to passengers not to take the stopped elevator.

14. The method of claim 11, wherein step B includes:

B1. generating the password associated with the target device, wherein the password is generated based on at least one of the following items: a random number, the identification of the target device and a timing signal;

B2. sending a message indicating that the dispatch command has been generated to the computer system, the message includes the generated password.

15. The method of claim 14, wherein the one or more set conditions further includes that there is no passenger in the car, and step C includes:

C1. comparing the password associated with the target device with a password received from the device in the car to determine the matching between them;

C2. determining presence of the passenger according to images or videos acquired by an image sensor arranged in the car.

16. The method of claim 11, wherein step B includes:

B1'. sending a message indicating that the dispatch command has been generated to the computer system, so that the computer system generates the password associated with the target device and sends a confirmation message containing the password to the target device, the password is generated based on at least one of the following items: an identification of the target device and a timing signal.

17. The method of claim 16, wherein the one or more set conditions further includes that there is no passenger in the car, and step C includes:

C1'. generating a password associated with the target device according to an algorithm;

C2'. performing an identity authentication of the device in the car by comparing the password generated according to the algorithm with a password received from the device in the car;

C3'. determining presence of the passenger according to images or videos acquired by an image sensor arranged in the car.

18. The method of claim 11, wherein step B includes:

B1' sending a message indicating that the dispatch command has been generated to the computer system, so that the computer system generates a password associated with the target device, sends a confirmation message containing the password to the target device, and sends the password to the elevator controller, the password is generated based on at least one of the following items: a random number, an identification of the target device and a timing signal.

19. The method of claim 18, wherein the one or more set conditions further includes that there is no passenger in the car, and step C includes:

C1' performing an identity authentication of the device in the car by comparing the password from the computer system with a password received from the device in the car;

C2' determining presence of the passenger according to images or videos acquired by an image sensor arranged in the car.

20. The method of claim 11, further comprising the steps of:

E. if a number of occurrences of events that do not satisfy the one or more set conditions is greater than a predetermined threshold, a warning message is generated;

F. receiving settings of rejecting all elevator reservation messages or rejecting elevator reservation messages with characteristics specified by user input.

21. A non-transitory computer-readable storage medium having instructions stored in the non-transitory computer-readable storage medium, when the instructions are executed by a processor, the processor is caused to execute the method of claim 1.

22. A first computer system comprising:

memory;

processor; and a computer program stored on the memory and running on the processor, the running of the computer program causes:

A. generating an elevator reservation message in response to an elevator ride request from a second computer system, wherein the elevator ride request and the elevator reservation message include an identification of a target device with self-propelled capability and an identification of a departure floor;

B. sending the generated elevator reservation message to an elevator controller to instruct the elevator controller to generate a dispatch command for stopping an elevator car to the departure floor of the target device;

C. generating a confirmation message in response to a message from the elevator controller indicating that the dispatch command has been generated, the confirmation message includes a password associated with the target device, wherein the password is used for an identity authentication of the target device when taking an elevator; and D. sending the generated confirmation message to the target device;

wherein the identification of the target device is an international mobile user identification number associated with a user identification module set on the target device.

23. The first computer system of claim 22, wherein the first computer system sends the generated confirmation message to the target device via 4G or 5G mobile communication network.

24. The first computer system of claim 22, wherein the target device is one of the following: disinfection operation robots, dangerous goods monitoring operation robots, dangerous goods transporting operation robots, and device equipped with high-density energy storage units.

25. The first computer system of claim 22, wherein the elevator reservation message also includes a designation of an elevator operation mode and an identification of an arrival floor.

26. The first computer system of claim 22, wherein the running of the computer program causes step C to include:

C1. receiving a password associated with the target device from the elevator controller;

C2. including the received password in the confirmation message.

27. The first computer system of claim 22, wherein the running of the computer program causes step C to include:

C1'. generating a password associated with the target device;

C2'. including the generated password in the confirmation message.

28. The first computer system of claim 27, wherein the running of the computer program causes step C to further include:

C3': sending the generated password to the elevator controller.

29. A method for providing elevator services for a target device with self-propelled capability, comprising the following steps performed by a first computer system:

A. generating an elevator reservation message in response to an elevator ride request from a second computer system, wherein the elevator ride request and the elevator reservation message include an identification of a target device with self-propelled capability and an identification of a departure floor;

B. sending the generated elevator reservation message to an elevator controller to instruct the elevator controller to generate a dispatch command for stopping an elevator to the departure floor of the target device;

C. generating a confirmation message in response to a message from the elevator controller indicating that the dispatch command has been generated, the confirmation message includes a password associated with the target device, wherein the password is used for an identity authentication of the target device when taking an elevator; and D. sending the generated confirmation message to the target device;

wherein the identification of the target device is an international mobile user identification number associated with a user identification module set on the target device.

30. The method of claim 29, wherein the first computer system sends the generated confirmation message to the target device via 4G or 5G mobile communication network.

31. The method of claim 29, wherein the elevator reservation message also includes a designation of an elevator operation mode and an identification of an arrival floor.

32. The method of claim 29, wherein step C includes:

C1. receiving a password associated with the target device from the elevator controller;

C2. including the received password in the confirmation message.

33. The method of claim 29, wherein step C includes:

C1'. generating a password associated with the target device;

C2'. including the generated password in the confirmation message.

34. The method of claim 33, wherein step C further includes:

C3': sending the generated password to the elevator controller.

35. A non-transitory computer-readable storage medium having instructions stored in the non-transitory computer-readable storage medium, when the instructions are executed by a processor, the processor is caused to execute the method of claim 1.

* * * * *